United States Patent
Lozovsky

(10) Patent No.: US 11,844,045 B2
(45) Date of Patent: Dec. 12, 2023

(54) DEVICE AND METHOD FOR GEO-LOCATION

(71) Applicant: HOOPO SYSTEMS LTD., Ramat-Hasharon (IL)

(72) Inventor: Ilan Lozovsky, Ramat-Hasharon (IL)

(73) Assignee: HOOPO SYSTEMS LTD., Ramat-Hasharon (IL)

( * ) Notice: Subject to any disclaimer, the term of this patent is extended or adjusted under 35 U.S.C. 154(b) by 195 days.

(21) Appl. No.: 17/432,108

(22) PCT Filed: Mar. 12, 2020

(86) PCT No.: PCT/IL2020/050294
§ 371 (c)(1),
(2) Date: Aug. 19, 2021

(87) PCT Pub. No.: WO2020/188557
PCT Pub. Date: Sep. 24, 2020

(65) Prior Publication Data
US 2022/0191820 A1    Jun. 16, 2022

Related U.S. Application Data

(60) Provisional application No. 62/820,283, filed on Mar. 19, 2019.

(51) Int. Cl.
*H04W 64/00* (2009.01)
*H04W 4/70* (2018.01)
*G01S 5/00* (2006.01)

(52) U.S. Cl.
CPC ......... *H04W 64/006* (2013.01); *G01S 5/0036* (2013.01); *G01S 5/0063* (2013.01); *H04W 4/70* (2018.02)

(58) Field of Classification Search
CPC ....... H04W 4/70; H04W 84/18; H04W 4/029; H04W 4/38; H04W 12/106; H04W 4/08;
(Continued)

(56) References Cited

U.S. PATENT DOCUMENTS 10,212,494 B1    2/2019  Struhsaker et al.
2016/0261458 A1*  9/2016  Huang ................ H04L 43/0817
(Continued)

FOREIGN PATENT DOCUMENTS

WO    2018183789 A1   10/2018

*Primary Examiner* — Kwasi Karikari
(74) *Attorney, Agent, or Firm* — ALPHAPATENT ASSOCIATES, LTD; Daniel J. Swirsky

(57) ABSTRACT

An Internet of things (IoT) node operating in a low-power wide-area (LPWA) IoT network includes a store to keep at least a node unique ID, an incoming message processor configured to receive incoming messages over an LPWA and create an information unit associated with the incoming message, and an outgoing message creator configured to create an outgoing message and transmit it using the same LPWA protocol, the outgoing message includes the node unique ID and the information unit. A method for providing information to an application for computing geolocation of a moving appliance in an Internet of things (IoT) network includes receiving a radio signal over LoRa™ from an IoT device, computing an RSSI, creating an outgoing message with the ID of the receiving device, the ID of the sending device and the computed RSSI and sending the outgoing message to the application over LoRa™.

15 Claims, 5 Drawing Sheets

(58) Field of Classification Search
CPC ....... H04W 12/69; H04W 4/021; H04W 4/80;
H04W 88/16; H04W 4/90; H04W 76/15;
H04W 24/02; H04W 84/12; H04W 12/76;
H04W 24/04; H04W 64/00; H04W 4/02;
H04W 4/023; H04W 24/08; H04W 16/18;
H04W 72/542
See application file for complete search history.

(56) References Cited

U.S. PATENT DOCUMENTS

| | | |
|---|---|---|
| 2016/0345265 A1 | 11/2016 | Lee et al. |
| 2017/0230907 A1* | 8/2017 | Rose ................ G01D 4/004 |
| 2018/0124590 A1 | 5/2018 | O'Connell et al. |
| 2018/0205486 A1 | 7/2018 | Lin et al. |
| 2020/0107402 A1* | 4/2020 | Di Girolamo ........ H04W 88/16 |

* cited by examiner

DEVICE AND METHOD FOR GEO-LOCATION

CROSS REFERENCE TO RELATED APPLICATION

This application claims priority and benefits from U.S. provisional patent application 62/820,283, filed Mar. 19, 2019 incorporated herein by reference.

FIELD

The present invention relates to the field of communication technology in general, and in particular, to IoT devices.

BACKGROUND

The Internet of things (IoT) is a network of devices, each containing hardware, software and connectivity which allows them to connect, interact and exchange data. Data collected in an IoT network may be used by a variety of applications in areas such as industry, transportation, logistics, healthcare, smart environment, city information and the like.

An IoT network comprises IoT devices and IoT gateways. The IoT devices collect data from their surroundings (e.g. using a variety of sensors) and pass the collected data to IoT gateways that provide bidirectional connectivity between the IoT devices and the application in the cloud handling the collected information. An IoT gateway acts as a relay that receives information from the IoT devices and pass it to the internet.

The IoT devices and the IoT gateways may communicate over a wireless communication channel such as a low-power wide-area (LPWA) network (referred herein also as LPWAN) and may be equipped with an embedded technology such as LoRa™ for communication. IoT devices cannot communicate with other IoT devices, only with IoT gateways and similarly, IoT gateways cannot communicate with other IoT gateways but only with IoT devices.

The IoT gateway may communicate with the IoT devices using an LPWAN protocol (e.g. LoRa™) and with the cloud (e.g. an IP network such as a local cloud or the internet) using any network protocol (e.g. IP, Wifi, Ethernet, etc.) therefore the IoT gateway consumes relatively large amount of power and should be connected to a power supply and to the internet in order to operate properly.

The IoT gateway may receive the data from the IoT devices (over the LPWA protocol) and may preprocess and filter the received information before forwarding it to the cloud. The IoT gateway may also transmit control commands received from the cloud to the IoT devices and acts as a protocol translator between the LPWA and the internet.

In many cases, the IoT devices change their location and applications handling the information received from them need the precise geographic location of each IoT device they interact with, therefore in many cases the IoT device is equipped with a global positioning system (GPS), and may use Bluetooth low energy (BLE) beacons for identifying a close proximity to a known location.

The GPS technology may be used when the IoT network is installed outdoors. The devices may have connectivity with the satellites and may compute their geographic location using the information received from the satellites however, a GPS technology embedded into a device may increase its cost, reduce the lifetime of its battery and may be ineffective indoors.

BLE and Radio Frequency Identification (RFID) technologies may be used when the IoT network is installed indoors however, embedded into a device, both BLE and RFID may require the installation of an additional extensive infrastructure for reading the information needed for the geolocation calculation from the IoT devices.

Both indoors and outdoors, the geolocation accuracy of an IoT device, computed using the technologies mentioned herein above, may be poor because of various factors such as geometric dilution of precision (GDOP) and multipath issues that may interfere with the communication.

SUMMARY

There is provided, in accordance with an embodiment of the present invention, an Internet of things (IoT) node operating in a low-power wide-area (LPWA) IoT network. The IoT node includes a store to keep at least a node unique ID, an incoming message processor configured to receive incoming messages over an LPWA protocol, and create an information unit associated with the incoming message and an outgoing message creator configured to create an outgoing message and transmit the outgoing message using the same LPWA protocol, the outgoing message includes at least the node unique ID and the information unit.

Additionally, in accordance with an embodiment of the present invention, the LPWA technology is LoRa™.

Moreover, in accordance with an embodiment of the present invention, the incoming message comprises a sender ID.

Furthermore, in accordance with an embodiment of the present invention, the information unit includes the sender ID and the node unique ID.

Still further, in accordance with an embodiment of the present invention, the incoming message processor is configured to compute radio characteristics associated with the incoming message and the outgoing message creator is configured to insert radio characteristics to the information unit.

Additionally, in accordance with an embodiment of the present invention, the radio characteristics may be received signal strength indication (RSSI), time of arrival (TOA); differential times of arrival (DTOA) and angle of arrival (AOA).

Moreover, in accordance with an embodiment of the present invention, the outgoing message creator is configured to retrieve data from the store and insert it to the information unit, the data includes global positioning system (GPS) coordinates.

Furthermore, in accordance with an embodiment of the present invention, the incoming message includes configuration data and the incoming message processor is configured to store the configuration data in the store.

Still further, in accordance with an embodiment of the present invention, the configuration data includes transmission-time, transmission power, reception-slots, spreading factor, reception windows and operation mode.

Moreover, in accordance with an embodiment of the present invention, the incoming message processor and the outgoing message creator read the configuration data from the store and operate according to the configuration.

There is provided, in accordance with an embodiment of the present invention, a method for providing information to an application for computing geolocation of a moving entity in an Internet of things (IoT) network. The method includes receiving by an IoT node a radio signal over LoRa™ from an IoT device, the radio signal includes an ID of the IoT device. The method also includes computing a received signal strength indication (RSSI) associated with the received radio signal, creating an outgoing message with an ID of the IoT node, the ID of the IoT device and the computed RSSI value and sending the outgoing message to the application over LoRa™ via an IoT gateway.

Moreover, in accordance with an embodiment of the present invention, the sending device is installed on a moving appliance and the receiving device is installed in a fixed known location.

Moreover, in accordance with an embodiment of the present invention, the receiving device is installed on a moving appliance and the sending device is installed in a fixed known location.

BRIEF DESCRIPTION OF THE DRAWINGS

The invention will now be described in relation to certain examples and embodiments with reference to the following illustrative drawing figures so that it may be more fully understood. In the drawings.

Figure 1:
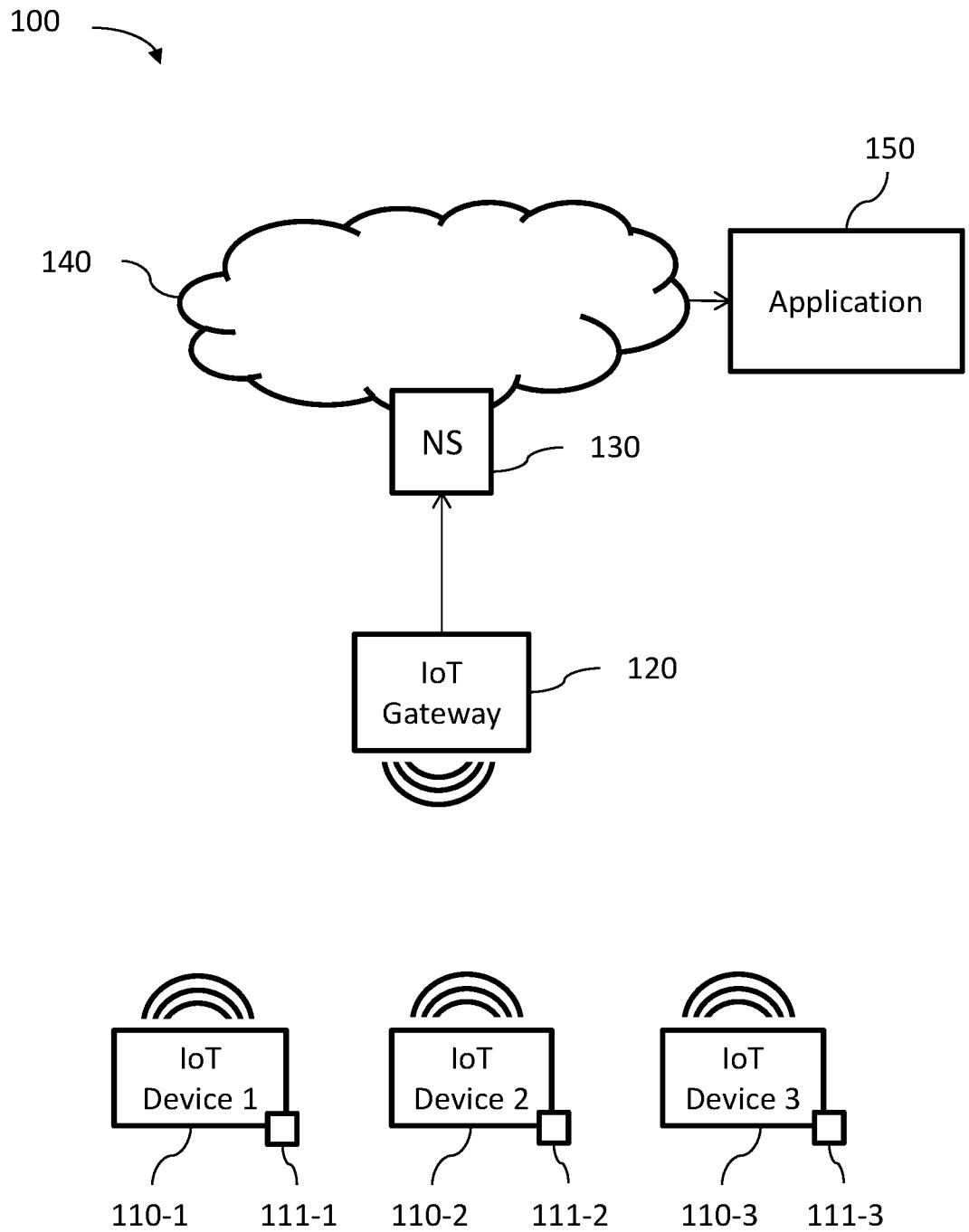
FIG. 1 is a schematic illustration of a known in the art IoT network.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate the same or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Embodiments of the present invention provide methods and devices for generating and supplying sufficient information that facilitates the calculation of the location of IoT devices, possibly changing their location, in an IoT network. The method and the device, referred herein as an IoT node, are capable of generating the needed information both indoors and outdoors, using the built-in communication protocol (e.g. LoRa™) in locations suffering from various interfering issues such as GDOP and multipath. The device and method are capable of relaying the generated information to an application for calculating the accurate geolocation of IoT devices using for example the method described in PCT publication WO 2017/122206, assigned to the common assignee of the present invention.

Devices implemented in accordance with the present invention are cheap and require minimum cost for installation and maintenance. The devices may consume little power for their operation thereby providing a long battery lifetime. Furthermore, using the communication method (e.g. LoRa™) of the IoT appliances (IoT devices and IoT gateways) the IoT nodes support seamless interworking with existing IoT appliances providing geolocation information without additional technologies except for the usual embedded communication protocol.

FIG. 1, to which reference is now made, is a schematic illustration of a prior art IoT network 100. IoT network 100 comprises a plurality of IoT devices 110 (110-1, 110-2 and 110-3) communicating over the air with an IoT gateway 120 that further communicates with a network server (NS) 130 in cloud 140 to which an application 150 is connected. Application 150 may receive the information communicated by the plurality of devices 110 and may process it as needed to provide any applicable functionality. Application 150 may provide the location of IoT devices 110 when location related information is received from them. IoT devices 110 may communicate such information when they are equipped with specific means 111 (111-1, 111-2 and 111-3) such as GPS (capable of providing the location), or BLE or RFID capable of providing indications regarding the proximity to known locations.

Figure 2:
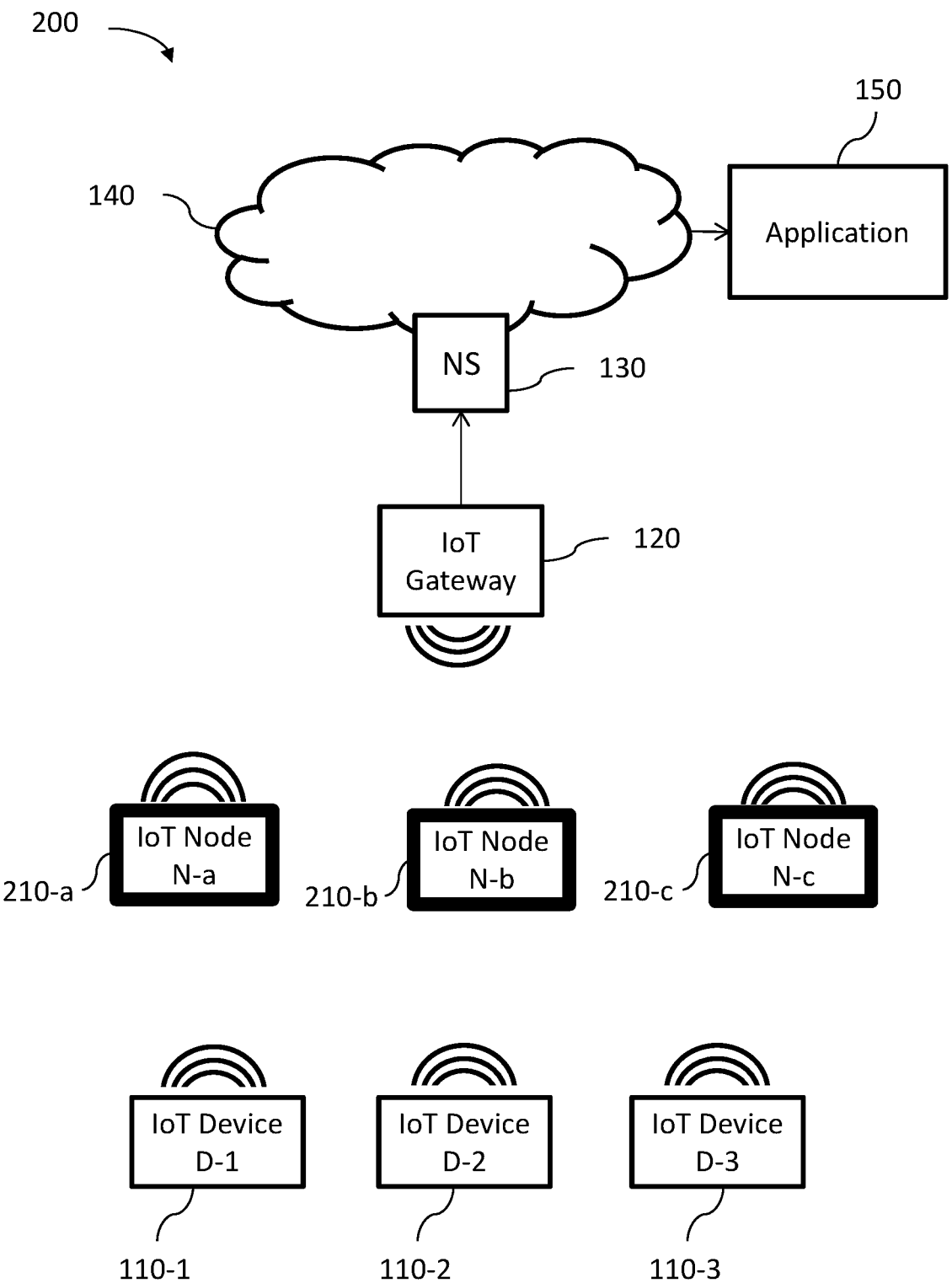
FIG. 2 is a is a schematic illustration of an IoT network, according to embodiments of the present invention.

FIG. 2, to which reference is now made, is a schematic illustration of an IoT network 200 operative in accordance with an embodiment of the present invention. IoT network 200 is equipped with IoT nodes 210, constructed and operative in accordance with the present invention. IoT nodes 210 are capable of providing information related to IoT devices 110 located in the surrounding. From the provided information the geolocation of IoT nodes 210 and/or IoT devices 110 may be determined. IoT network 200, comprises a plurality of IoT devices 110 (110-1, 110-2 and 110-3), a plurality of IoT nodes 210 (210-*a*, 210-*b* and 210-*c*) and a plurality of IoT gateways 120 (for clarity of the drawing, only one IoT gateway is illustrated). IoT gateways 120 may communicate with network server 130 in cloud 140 to which an application 150 is connected.

IoT devices 110 or IoT nodes 210 may be placed in predetermined locations in IoT network 200. IoT nodes 210 may provide information to application 150 (via IoT gateways 120) from which a location of moving assets may be determined. When an IoT node 210 is attached to a moving asset, IoT devices in IoT network 200 may be installed in known stationary locations and application 150 may determine the location of the IoT node 210 based on the information it provides. When an IoT device 110 is attached to a moving asset, IoT nodes 210 may be installed in known stationary locations and application 150 may determine the location of the IoT device 110 based on the information provided by IoT nodes 210. In both cases, the information that includes the identification of the two devices and may be sent to IoT gateway 120.

When stationary, the distances between IoT nodes 210, installed in IoT network 200, may be determined according to the specific needs of each IoT network 200. When proximity to a known location is required, the distance between IoT nodes 210 may be determined to enable a communication between an IoT device 110 with at least one IoT node 210. When an exact location is required, the distance between IoT nodes 210 may be determined to enable simultaneous communication between an IoT device 110 and at least three IoT nodes 210. For example, the distance between IoT nodes 210 may range from 1.1 to 1.9 the expected reception range of IoT device 110.

A similar consideration regarding the location of IoT devices 110 when installed in stationary locations may be taken when IoT nodes 210 are installed on moving assets.

IoT nodes 210 may communicate with both IoT devices 110 and IoT gateways 120. When communicating with an IoT gateway 120, IoT node 210 may look like an IoT device 110 to IoT gateway 120, and when communicating with an IoT device 110 IoT node 210 may look like an IoT gateway 120 to IoT device 110.

Figure 3:
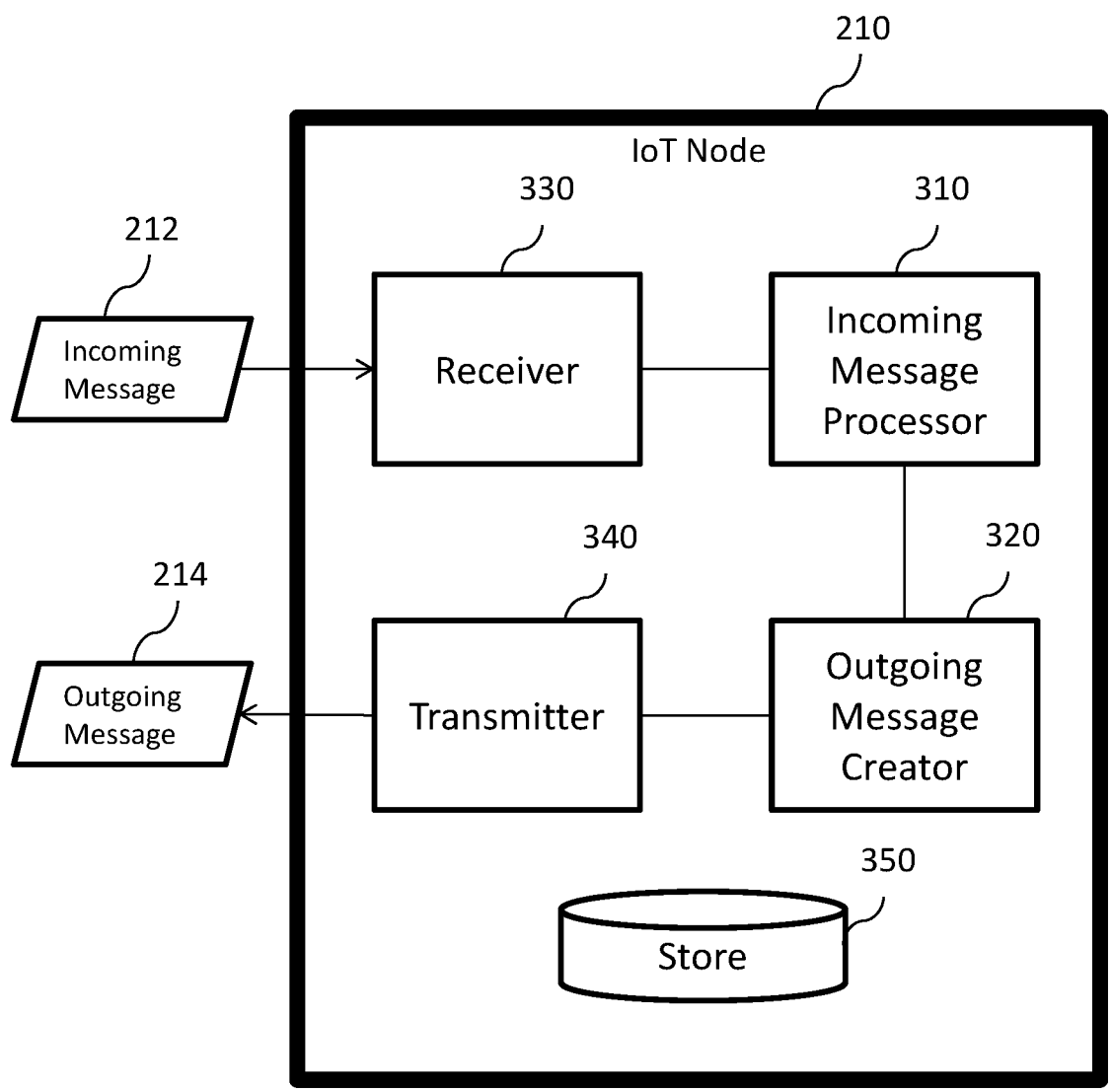
FIG. 3 is a schematic illustration of an IoT node, constructed and operative in accordance with an embodiment of the present invention, installed as part of the IoT network of FIG. 2.

FIG. 3, to which reference is now made, is a schematic illustration of an IoT node 210, constructed and operative in accordance with an embodiment of the present invention. IoT node 210 may be a small and low-cost device equipped with embedded low-power wide-area (LPWA) network technology (e.g. LoRa™) capable of communicating with both IoT devices 110 and IoT gateways 120. IoT node 210 may be operated by a battery similar to IoT devices 110.

IoT node 210 comprises an incoming message processor 310 connected to a receiver 330; an outgoing message creator 320 connected to a transmitter 340 and a store 350, connected to both incoming message processor 310 and outgoing message creator 320. IoT node 210 may use the information in store 350 to function properly.

Store 350 may keep various information such as an ID of the node, and various configuration parameters such as transmission-time, transmission power, reception-slots, spreading factor and the like and other information needed to operate the node such as operation mode described herein below. IoT node 210 may operate according to the configuration data kept in store 350 (i.e. listen in the reception slots, transmit in the transmission-time using the specified transmission power etc.)

Receiver 330 and transmitter 340 may communicate over the air with IoT devices 110, IoT gateways 120 and other IoT nodes 210 over LPWAN. IoT node 210 may communicate over the air using any LPWAN protocol and in one embodiment of the present invention, IoT node 210 may use LoRa™ as a communication protocol.

Incoming message processor 310 may receive any number of incoming messages 212, demodulate the messages from the signal and evaluate various signal related information such as received signal strength indication (RSSI); time of arrival (TOA); differential times of arrival (DTOA); angle of arrival (AOA) and the like. If the message includes configuration commands from an IoT gateway 120, incoming message processor 310 may store the configuration in store 350.

Outgoing message creator 320 may create an outgoing message 214 containing data extracted from the received incoming messages, and information retrieved from store 350 such as the node ID. Outgoing message creator 320 may determine the modulation to be used by transmitter 340 according to destination of outgoing message 214 (the destination may be an IoT device 110, an IoT gateway 120 or an IoT node 210). Transmitter 340 may modulate outgoing message 214 using the determined modulation and transmit it.

Depending on the needs and circumstances, IoT node 210 may be configured differently to communicate with other devices in the IoT network. IoT node 210 may be configured to operate in beacon mode or in relay mode. When configured to operate in beacon mode, IoT node 210 periodically transmits its ID in outgoing message 214. When configured to operate in relay mode, IoT node 210 may receive incoming messages 212 from IoT devices during a pre-determined period, process them, aggregate the information from numerous messages and add the collected information to a newly created outgoing message 214 to be sent to IoT gateway 120. IoT node 210 may be configured to communicate with other IoT nodes 210 and depending on the role of each instance, operate in beacon or relay modes.

A standard IoT gateway 120 may manage and control IoT nodes 210 in the same way it manages a standard IoT device 110. The control commands may include configuration of different parameters of an IoT gateway and an IoT device such as transmission-time, transmission power, reception-slots, spreading factor (SF) and the like. If not otherwise configured, IoT node 210 may by default transmit periodically and may allocate receive windows in a random manner. IoT node 210 may also be configured to open and close receive windows based on specific triggers. For example, IoT node 210 may use specific signals received from an accelerometer as triggers to start and stop listening.

Figure 4:
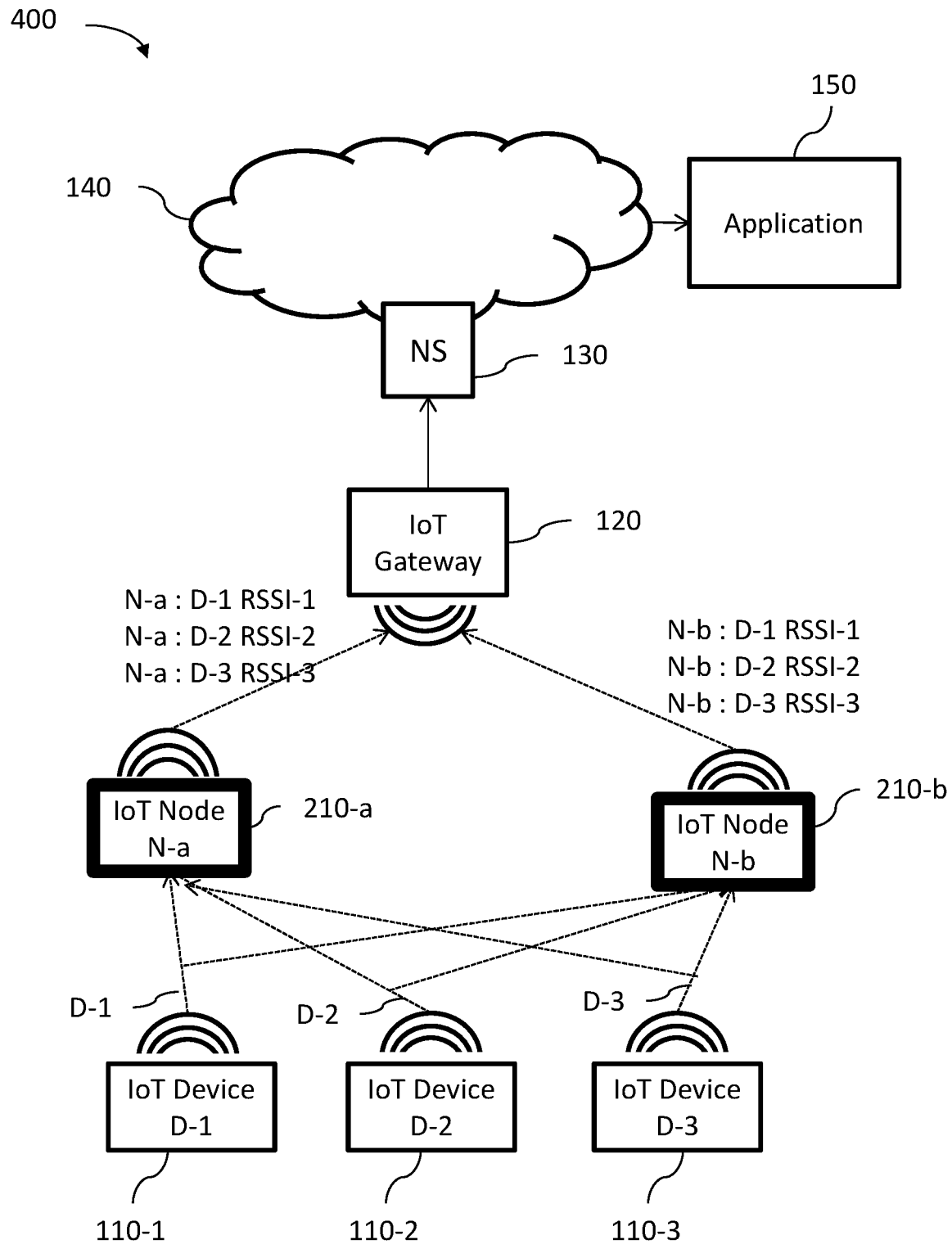
FIG. 4 is a schematic illustration of an IoT network, operative in accordance with an embodiment of the present invention, where the IoT nodes are configured to work in relay mode.

FIG. 4, to which reference is now made, is a schematic illustration of an IoT network 400, operative in accordance with an embodiment of the present invention. In this case, IoT nodes 210 may be configured to work in relay mode, periodically receiving transmissions form IoT devices 110, creating new outgoing messages with data related to the received signals from one or more IoT devices 110 and send the new message to IoT gateway 120. For clarity, only two IoT devices 110, two IoT nodes 210 and one IoT gateway are illustrated though there may be a much larger number of devices of any type.

In IoT network 400 IoT nodes 210 (210-*a* and 210-*b*) may be installed in known stationary locations and receive transmissions from moving IoT devices 110 (110-1; 110-2 and 110-3. Alternatively, IoT devices 110 may be installed in known stationary locations periodically transmitting their ID and IoT nodes 210, installed on movable assets may receive transmissions from stationary IoT devices 110 when passing near them.

Each IoT node 210 may demodulate the received messages and calculate various radio characteristics (e.g. RSSI) associated with each received signal. Each IoT node 210 (210-*a* and 210-*b*) may create information units related to each received message (denoted as D-1 RSSI-1 and D-2 RSSI-2) and create and transmit a new outgoing message that includes its own ID and the created information units to IoT gateway 120 (information unit D-1 RSSI-1 denoted as N-a:D-1 RSSI-1 when sent from IoT node with ID N-a).

IoT nodes 210, configured to work as beacons, may be installed in predefined locations in an area of interest, where the geolocation information of IoT devices 110 is required. IoT nodes 210 may receive several transmissions of ID from several IoT devices 110, may calculate the RSSI value of each transmission and may transmit the information units to IoT gateway 120.

According to an embodiment of the present invention the location of IoT device 110 may be determined by application 150 from the information units received from IoT gateway 120. Application 150 may calculate the location of IoT device 110 from the RSSI values associated with several IoT nodes 210, whose locations are known. Alternatively, application 150 may calculate the location of IoT nodes 210 from the RSSI values associated with IoT device 110 whose locations are known. When an IoT node 210 is installed on a moving asset, application 150 may track the movement of the asset according to the received information units and the known locations of the IoT devices 110.

Figure 5:
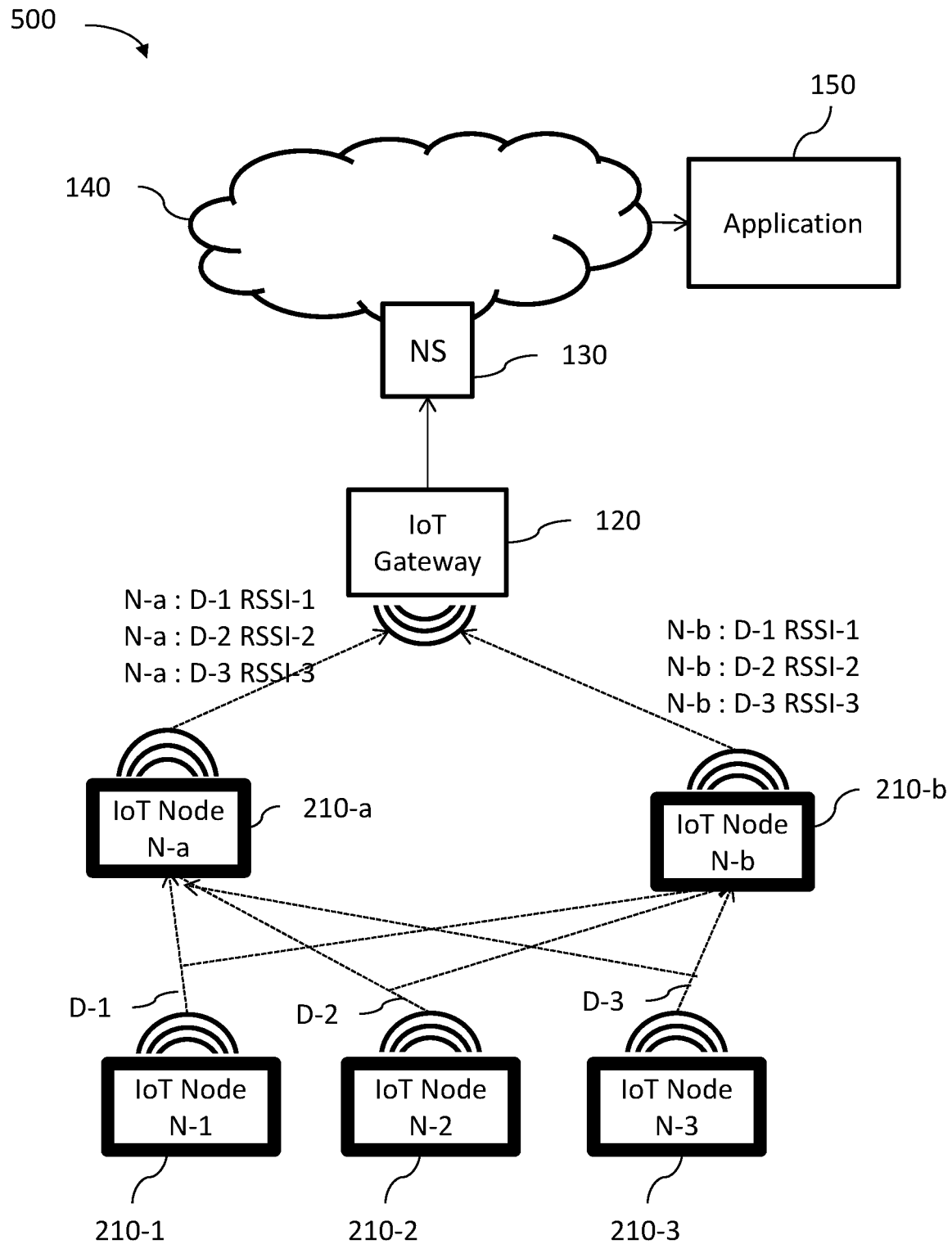
FIG. 5 is a schematic illustration IoT network 500, operative in accordance with an embodiment of the present invention, where some of the IoT nodes are configured to work in relay mode and other IoT nodes are configured to work in beacon mode.

FIG. 5, to which reference is now made, is a schematic illustration of an IoT network 500, operative in accordance with an embodiment of the present invention, where some of the IoT nodes 210 (210-*a* and 210-*b*) may be configured to work in relay mode, periodically receiving transmissions, creating new outgoing messages and sending the new outgoing messages to IoT gateway 120 while other IoT nodes 210 (210-1; 210-2 and 210-3) are configured to work in beacon mode, periodically transmitting their ID.

When configured to work in beacon node outgoing message creator 320 may transmit the ID of IoT node 210 via transmitter 340.

In both IoT network 400 and IoT network 500, IoT gateway 120 may receive a plurality of information units (each information unit comprises the ID of two appliances one of them an IoT node 210, and the other another IoT node 210 or an IoT device 110 and a calculated RSSI). The information units may be used by application 150 to calculate the location of IoT device 110 using the known locations of IoT nodes 210, or the location of IoT node 210 using the known locations of IoT devices 110.

IoT nodes 210 may be equipped with sensors such as a global positioning system (GPS) and may add the information captured by the sensor to outgoing message 214.

IoT nodes 210 according to embodiments of the present invention may be used for locating "things" in a variety of applications such as locating a variety of non-motorized ground equipment (e.g. suitcases) in an airport, locating containers in loading points, locating equipment in locations such as hospitals and the like.

IoT nodes 210 according to embodiments of the present invention may provide a simple, low-cost device, possibly battery operated, capable of performing tasks of both an IoT device and an IoT gateway using the same IoT transmission method utilized in existing LPWA networks therefore may seamlessly operate in a standard LPWA and/or otherwise existing LPWA networks with an install base of standard IoT appliances.

IoT nodes 210 according to embodiments of the present invention do not need to support an additional dedicated method for location purposes in addition to the methods and protocols used for their communication (e.g. LoRa™).

IoT nodes 210 according to embodiments of the present invention may provide enough data (information units) for the application to determine the geolocation of IoT devices 110 changing their location in an area of interest when other location methods fail to provide such geolocation due to interrupting factors.

IoT nodes 210 according to embodiments of the present invention may be used to receive transmissions over LoRa™, create a message containing information received in numerous transmissions and information associated with IoT node 210 itself (such as its ID or information gathered by various sensors) and convey the message over the same LoRa™ protocol to IoT gateways 120 and from there to the Internet. It may be appreciated that standard IoT gateway 120 cannot send messages (except for control commands) over LoRa™ to other IoT devices. In addition, a standard IoT gateway 120 consumes a lot of power using a broadband protocol such as WiFi or Ethernet and therefore needs to be connected to an electricity source.

Unless specifically stated otherwise, as apparent from the following discussions, it is appreciated that throughout the specification discussions utilizing terms such as "analyzing", "processing," "computing," "calculating," "determining," "detecting", "identifying" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

What is claimed is:

1. An Internet of things (IoT) node operating in a low-power wide-area (LPWA) IoT network, the IoT node comprising:
    a store comprising at least a node unique ID;
    an incoming message processor configured to
        receive an incoming message from any of a) a first IoT device, b) a first IoT gateway, and c) a second IoT node, over an LPWA protocol, and
        create an information unit associated with the incoming message in response; and
    an outgoing message creator configured to create an outgoing message and transmit the outgoing message to any of a) a second IoT gateway, b) a second IoT device, and c) a third IoT node using the LPWA protocol, wherein the outgoing message comprises at least the node unique ID and the information unit.

2. The IoT node of claim 1 wherein the LPWA protocol is LoRa™.

3. The IoT node of claim 1 wherein the incoming message processor is further configured to compute radio characteristics associated with the incoming message and insert the computed radio characteristics to the information unit.

4. The IoT node of claim 3 wherein the radio characteristics are any of a) received signal strength indication (RSSI), b) time of arrival (TOA), c) differential times of arrival (DTOA), and d) angle of arrival (AOA).

5. The IoT node of claim 1 also comprising a location sensor to capture a location and wherein the outgoing message creator is configured to insert the location to the outgoing message.

6. The IoT node of claim 1 wherein the incoming message comprises configuration data and the incoming message processor is configured to store the configuration data in the store.

7. The IoT node of claim 6 wherein the configuration data comprises transmission-time, transmission power, reception-slots, spreading factor, reception windows, and operation mode.

8. The IoT node of claim 7 wherein the incoming message processor and the outgoing message creator read the configuration data from the store and operate according to the configuration.

9. The IoT node of claim 1 wherein the outgoing message creator is further configured to aggregate a plurality of information units and insert the plurality of information units to the outgoing message.

10. A method for providing information to an application for computing geolocation of a moving entity in a low-power wide-area (LPWA) Internet of things (IoT) network, the method comprising:
    receiving by a first IoT node a radio signal from a sending IoT apparatus over an LPWA protocol, wherein the sending IoT apparatus is any of a) a first IoT device, and b) a second IoT node, wherein the radio signal comprises an ID of the sending IoT apparatus;
    computing radio characteristics associated with the radio signal;

creating an outgoing message comprising an ID of the IoT node, the ID of the sending IoT apparatus, and the radio characteristic; and sending the outgoing message to the application over the LPWA protocol via an IoT gateway, wherein the application is configured to calculate an accurate geolocation of the sending IoT apparatus utilizing the information provided by the outgoing message.

11. The method of claim 10 wherein the sending IoT apparatus is installed on a moving appliance and the receiving IoT node is installed in a fixed known location.

12. The method of claim 10 wherein the receiving IoT node is installed on a moving appliance and the sending IoT apparatus is installed in a fixed known location.

13. The method of claim 10 wherein the LPWA protocol is LoRa™.

14. The method of claim 10 wherein the radio characteristics are any of a) received signal strength indication (RSSI), b) time of arrival (TOA), c) differential times of arrival (DTOA), and angle of arrival (AOA).

15. The method of claim 10 further comprising receiving a plurality of radio signals from a plurality of sending IoT apparatuses, and the creating an outgoing message step further comprises inserting the ID and the radio characteristic of each of the sending IoT apparatuses.

* * * * *